March 15, 1966  G. A. BRENNAN ET AL  3,240,477
TRANSIT MIXER WEIGHT DISTRIBUTION RELIEF DEVICE
Filed July 9, 1964  2 Sheets-Sheet 1
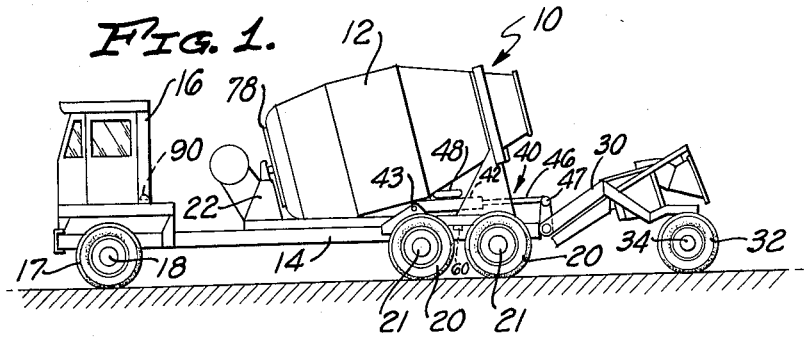
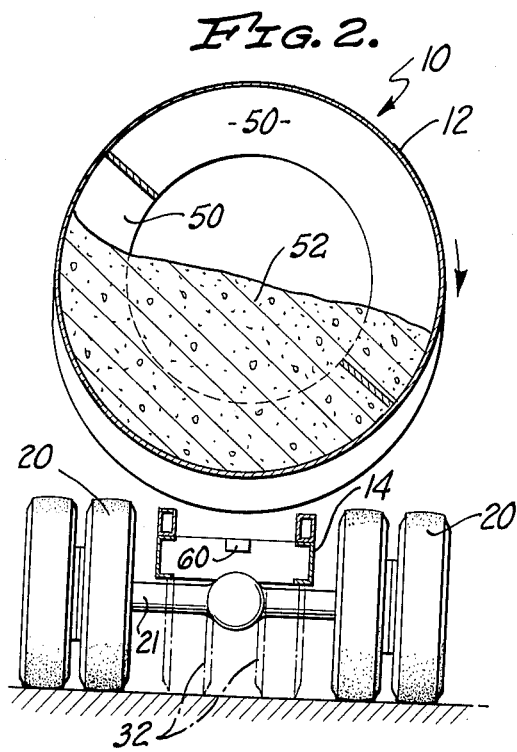
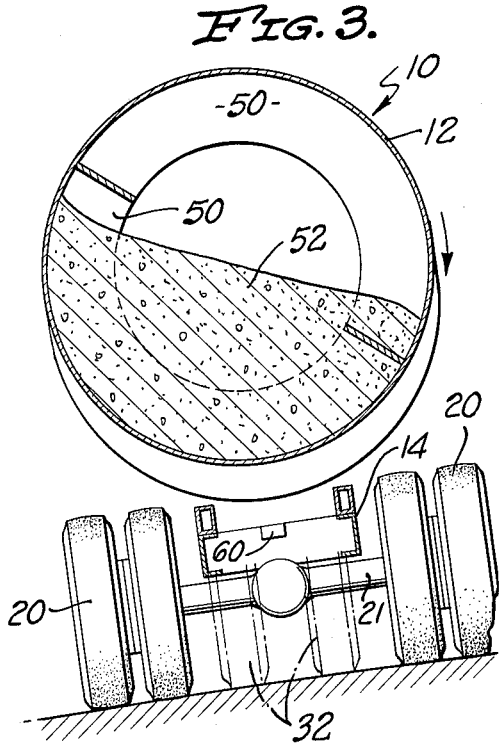
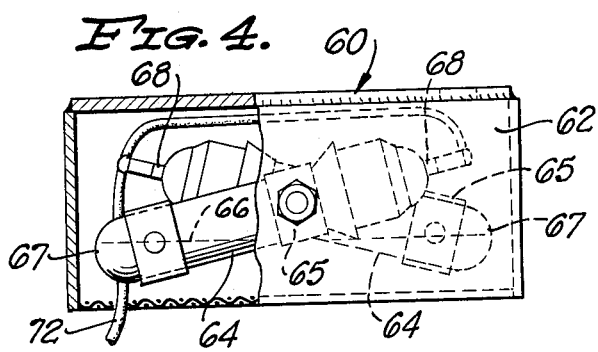
INVENTORS
GEORGE A. BRENNAN,
EVAN S. PRICHARD
BY
MAHONEY, HALBERT &
HORNBAKER
ATTORNEYS March 15, 1966 G. A. BRENNAN ET AL 3,240,477
TRANSIT MIXER WEIGHT DISTRIBUTION RELIEF DEVICE
Filed July 9, 1964 2 Sheets-Sheet 2
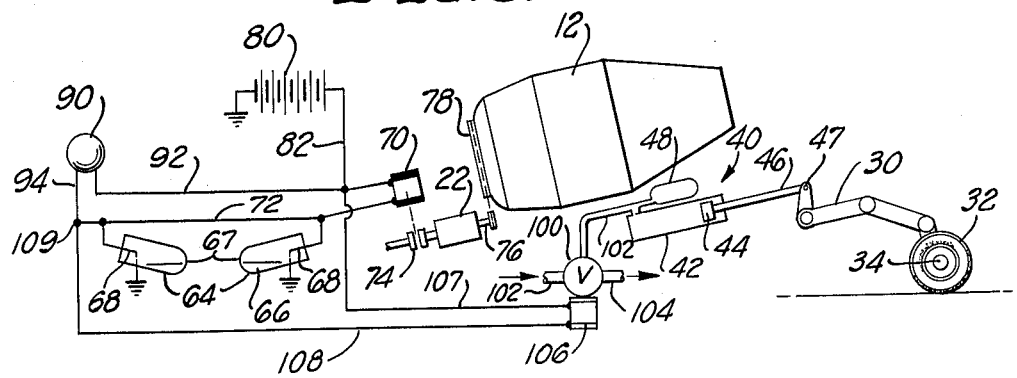
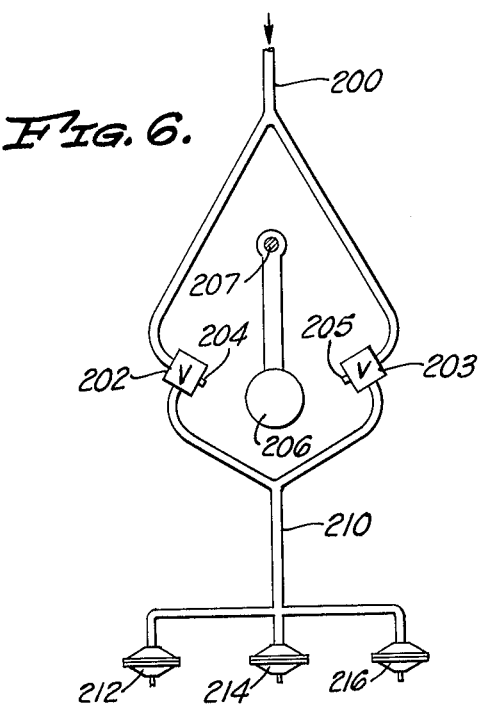
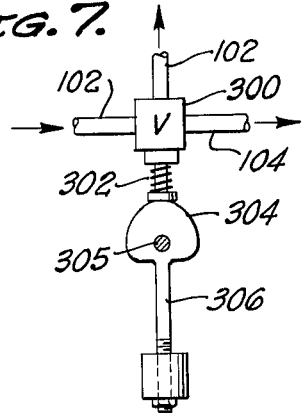
INVENTORS
GEORGE A. BRENNAN,
EVAN S. PRICHARD
BY
MAHONEY, HALBERT &
HORNBAKER
ATTORNEYS United States Patent Office 3,240,477
Patented Mar. 15, 1966

3,240,477
TRANSIT MIXER WEIGHT DISTRIBUTION RELIEF DEVICE
George A. Brennan, La Mirada, and Evan S. Prichard, Newport Beach, Calif., assignors to Challenge-Cook Bros., Incorporated, Los Angeles, Calif., a corporation of California
Filed July 9, 1964, Ser. No. 381,427
14 Claims. (Cl. 259—177)

This invention relates to a weight distribution relief device and, more particularly, to a device mounted on a transit mixer vehicle for relieving lateral weight distribution when changes in highway grade or driving posture cause a sharp change in the vehicle's center of gravity, so as to render the vehicle laterally unstable. The invention also incorporates a singalling device to warn the vehicle driver that lateral weight distribution has sharply changed, and that the vehicle is becoming laterally unstable.

During transit the loaded drum of a transit mixer is constantly rotated in a clockwise direction (viewed from the rear) so as to mix the aggregates in the drum by action of internally disposed helical blades. This clockwise rotational movement of the drum and the helical blades mounted therein causes a build-up of the load to the left side of the vehicle, so that the weight of the load is distributed more heavily to the left side of the truck on which the drum is mounted. Normally this weight build-up to the left side is compensated for by the lateral grade of the road, which is generally crowned at the center, sloping downwardly away to the sides of the roadbed so that, under normal transit conditions, a transit mixer when mixing and proceeding along a normal highway is satisfactorily stabilized laterally.

If, however, the vehicle encounters a lateral road grade which slopes in the opposite direction to that of a normal crowned highway, such as a sharply banked turn on the right side of the highway, the cargo build-up to the left side will render the vehicle laterally unstable, and unless the left side cargo build-up is quickly relieved, the vehicle may tip over on its left side.

Similar instability may result if such a vehicle is cornered too rapidly.

It is, therefore, an object of this invention to provide means for rapidly relieving the left side cargo build-up when such driving conditions are encountered, and to quickly return the vehicle to a more stable condition.

If the transit mixer is of the type described in United States Letters Patent No. 3,112,100, issued November 26, 1963, in which a trailing vehicle is pivotally mounted on the rear of the truck body frame and weight is distributed from the truck to the trailing vehicle by means of a fluid pressure system, it will be recognized that the axle of the trailing vehicle has a relatively narrow track compared with the track of the axle or axles for the rear wheels of the truck, and that the axle of the trailing vehicle produces little lateral restraint on the truck. If a substantial portion of the over-all weight is being distributed to the trailing vehicle during transit and the vehicle is suddenly sharply cornered, there will be a tendency to lateral tip-over.

It is, therefore, a further object of the invention to provide means for rapidly relieving the fluid pressure on the trailing vehicle under such driving conditions so as to promptly restore lateral stability.

It is yet another object of the invention to provide automatic signal means for warning the vehicle operator that, due to a change in driving conditions, the vehicle is becoming laterally unstable and may tip over.

A still further object of the invention is to provide a device of the character described which is uncomplicated but efficient, inexpensive to construct and assemble, and easy to install.

With these and other objects in view, the invention consists of the construction, arrangement and combination of the various elements of the device whereby the objects contemplated are attained, as hereinafter set forth, pointed out in the appended claims, and illustrated in the accompanying drawings, in which:

FIG. 1 is a side elevational view of a transit mix vehicle such as that described in United States Letters Patent No. 3,112,110, having a weight-distribution trailing vehicle mounted on the vehicle body frame;

FIG. 2 is an enlarged vertical cross-sectional view of a tarnsit mixer proceeding in transit along a centrally crowned highway;

FIG. 3 is a view similar to FIG. 2, but showing the transit mixer proceeding in transit around an outside banked turn;

FIG. 4 is an enlarged plan view, partially broken away, of a switch box containing a preferred form of tilt switch;

FIG. 5 is a diagrammatic representation of the preferred form of the device of the present invention applied to declutch the drum driving means, to relieve fluid pressure in the vehicle shown in FIG. 1, and to signal danger;

FIG. 6 is a diagrammatic representation of a first alternative form of the device of the present invention; and FIG. 7 is a diagrammatic representation of a second alternative form of the device of the present invention.

In FIG. 1 of the drawings, there is shown a transit mix truck, generally designated 10, having a rotatable mixer drum 12 mounted on a body frame 14, and having an operator's cab 16 mounted at the forward end of the body frame 14. The truck 10 has forward steering wheels 17 mounted on an axle 18, and rear wheels 20 mounted on axles 21 which, as illustrated, may be tandem. Also mounted on the body frame 14 is a power unit 22 disposed so as to rotate the drum 12, portions of said power unit 22 being hereinafter described in more detail.

Pivotally mounted at the rear end of the body frame 14 is a trailing vehicle 30, having wheels 32 mounted on an axle 34. A fluid pressure system generally designated 40, which preferably comprises a fluid pressure cylinder 42 pivotally mounted at one end thereof on the body frame 14 adjacent the rear end of the body frame 14, as at 43, a reciprocating piston 44 within the cylinder 42 (see FIG. 5), and a protruding piston rod 46 pivotally connected at its free end to the trailing vehicle 30, as at 47, is disposed so as to exert rearward and downward pressure on the trailing vehicle 30, and thus transfer weight-load from the axles 18 and 21 of the truck 10 to the axle 34 of the trailing vehicle 30, in the manner described in United States Letters Patent No. 3,112,100. A fluid pressure accumulator 48 may also be provided in the system 40.

The enlarged cross-sectional view of FIG. 2 of the drawings shows that when the truck 10 is proceeding in transit along a crowned highway, with the lateral road grade upwardly inclining toward the center of the highway and with the drum 12 rotating in the clockwise direction of the arrow, helical mixer blades 50 mounted on the inside surface of the drum 12 will cause the aggregate cargo 52 within the drum 12 to assume a blade-induced surface curvature, aided by capillary and centrifugal actions, such as to build up the mass of the aggregate cargo 52 to the left side of the truck and reduce the mass to the right side of the truck, thereby providing greater cargo weight-load on the side of the higher crown of the lateral road grade, for greater stability.

Similarly, the view of FIG. 3 of the drawings shows that when an opposite lateral road grade, such as an outside banked turn, is encountered, with the lateral road grade inclining toward the outside edge of the highway, instead of toward the center of the highway, the action of the helical blades 50 in the drum 12 on the aggregate cargo will be the same, resulting in the disposition of a greater mass of the aggregate mix toward the low side of the lateral road grade, and a lesser mass toward the high side of the grade, causing substantially lessened stability as long as the action of the blades 50 continues. It is, therefore, apparent that to restore stability to the truck 10 when conditions such as those illustrated in FIG. 3 of the drawings are encountered, or when, in in turning, the operator corners the truck 10 too quickly, provision should be made for means to warn the driver that stability is being lost, and provision should also be made for automatically interrupting the mixer action of the blades 50 so that the mass of the aggregate cargo 52 may quickly assume a more stable posture within the drum 12.

To that end, the preferred form of the device of the present invention, shown diagrammatically in FIG. 5 of the drawings, is provided. As illustrated in FIG. 5, a switch sensitive to tilt and inertia forces in a lateral plane, such as a dual mercury tilt or inertia switch 60, is provided, the switch 60 being illustrated in detail in FIG. 4 of the drawings. It will be understood that the dual mercury tilt switch 60 is merely illustrative of a switch sensitive to tilt and inertia forces, and that, in lieu thereof, a pendulum-type switch, a magnetic-type switch (such as one in which a weight is held in place or attracted by a magnetic field), or other type of switch in which a predetermined amount of truck body tilt or predetermined amount of inertia force will cause the switch to operate, may be provided.

Referring to FIG. 4 of the drawings, the switch 60 has a switch box 62 in which a pair of tubes 64 are mounted by any suitable means, such as by clips 65. The tubes 64 are disposed so as to lie in opposite directions to each other at predetermined angles so that a predetermined amount of vehicle tilt or inertia force on either side of the truck 10 will cause a quantity of mercury 66 contained in one of the tubes 64 and normally disposed at a closed end 67 to move within the tube 64 affected by the tilt or inertia force from the closed end 67 of the tube 64 and make contact with an electrode 68 mounted on the other end of the tube 64.

The electrode 68 of each tube 64 is electrically connected to a clutch actuating means 70 by a line 72, the clutch actuating means 70 being mounted on a clutch 74 on the power unit 22. The power unit 22 has means, such as a sprocketed shaft 76 mechanically interlocked with a drive 78 on the drum 12, for rotating the drum 12. The disposition of the switch 60 and the clutch actuating means 70 is such that when, by reaction to tilt or inertia force, the quantity of mercury in one of the tubes 64 makes contact with the electrode on said tube 64, the switch 60 will close, and the clutch actuating means 70 will be activated to declutch the power unit 22, so that no rotating power will be applied to the drum 12 and, as above described, when the drum 12 and the mixer blades 50 therein are dormant, the aggregate cargo 52 therein will rapidly assume a more stable posture within the drum 12, and lateral stability will be restored to the vehicle.

Electrical power for the device is supplied from an electric power source, such as a battery 80. The battery 80 is electrically connected by a line 82 to the clutch actuating means 70.

A signal 90, which may be a buzzer or a light, and which is preferably mounted in the operator's cab 16, is also provided. The signal 90 is electrically connected to the battery 80, as by the line 92 terminalled to the line 82, and signal 90 is also electrically connected to the switch 60, as by the line 94 terminalled to the line 72. Thus, when by reaction to tilt or inertia force, the switch 60 is closed, in the manner hereinabove described, the signal 90 will be activated to warn the operator of dangerous lateral tilt in the vehicle.

When the device of the present invention is installed on a transit mixer having the weight-load distributing trailing vehicle of United States Letters Patent No. 3,112,100 mounted thereon, a pressure relief valve 100 is installed on the fluid pressure supply line 102 leading from a source of fluid pressure (not shown) to the cylinder 42, and a pressure relief line 104 is mounted on the valve 100. Mounted on the valve 100 is a valve actuator 106 which is electrically connected to the power source 80, as by a line 107, electrically connected to the switch 60, as by a line 108, and electrically connected to the signal 90, as by terminal connection of the line 94 to the line 108, as at 109. When, by reaction to tilt or inertia force, if for instance when the vehicle is sharply cornered, the switch 60 is closed, the valve actuator 106 will operate to open relief valve 100, allowing fluid pressure to flow in pressure relief line 104, thus relieving fluid pressure in the cylinder 42, in turn relieving weight load distribution to the trailing vehicle 30 and restoring stability to the truck 10.

Referring to FIG. 6 of the drawings, in the first alternative form of the device, in lieu of the electrical system hereinabove described, a forked fluid pressure line 200 leads from a fluid pressure source (not shown) to normally closed fluid pressure valves 202 and 203, which are laterally spaced apart from each other. The valves 202 and 203 have inwardly protruding actuating means 204 and 205, respectively, and disposed between the actuating means 204 and 205 is a weighted pendulum 206, pivotally mounted on the truck 10, as at 207, and disposed so as to swing or tilt on the exertion of inertia force to strike either the actuating means 204 or 205, and open the valve 202 or the valve 203, as the case may be.

The valves 202 and 203 are connected by a forked and branched fluid pressure line 210 to a fluid pressure actuated signal 212, similar to the signal 90, to a fluid pressure actuated valve actuator 214 similar to the valve actuator 106, and to fluid pressure actuated clutch actuating means 216, similar to the clutch actuating means 70. On tilt or the exertion of inertia force, the open valve 202 or 203, as the case may be, will operate the signal 212, the valve actuator 214, and the clutch actuating means 216, in the manner hereinabove described in reference to the preferred form of the invention.

In the second alternative form of the invention, as illustrated in FIG. 7 of the drawings, in lieu of the valve 100 and the valve actuator 106 of the preferred form of the invention, a valve 300 is installed on the fluid pressure supply line 102 and is connected to the pressure relief line 104. The fluid pressure supply line 102 is normally open through valve 300, and the pressure relief line 104 is normally closed.

A spring-biased valve actuator 302 protrudes downwardly from the valve 300 and is biased to abut on the cam surface of a cam 304. The cam 304 is pivotally mounted, as at 305, and has a depending weighted pendulum 306 mounted thereon. On tilt or exertion of inertia force, the pendulum 306 will cause the cam 304 to pivot, and the spring-biased actuator 302, following the cam 304, will be extended so as to close the fluid pressure line 102 from the valve 300 to the cylinder 42, and open the fluid pressure relief line 104, thus relieving fluid pressure in the cylinder 42, in turn relieving weight distribution to the trailing vehicle 30 and restoring stability to the truck 10 on sharp cornering.

Although the invention has been herein shown and described in what are conceived to be the most practical and preferred embodiments thereof, it is recognized that departures may be made therefrom within the scope of the invention, which is not to be limited to the details disclosed herein, but is to be accorded the full scope of the claims so as to embrace any and all equivalent structures and devices.

We claim:

1. A transit mixer weight distribution relief device which comprises: a rotatable aggregate mixer drum; means for mounting said drum on a vehicle; power means mounted on the vehicle and engageable with the drum for imparting movement to the drum; a clutch interposed between the power means and the drum; and means for automatically disengaging the clutch when the vehicle is tilted laterally.

2. A transit mixer weight distribution relief device as defined in claim 1, wherein the means for automatically disengaging the clutch when the vehicle is tilted laterally comprises: an electric power source; a switch mounted on the vehicle and electrically connected to the electric power source, said switch being normally open and disposed so as to close automatically an electric circuit when the vehicle is tilted laterally; and electric clutch actuating means mounted on the clutch and electrically connected to the switch, said clutch actuating means being disposed so as to disengage the clutch when the switch is closed.

3. A transit mixer weight distribution relief device as defined in claim 1, wherein the means for automatically disengaging the clutch when the vehicle is tilted laterally comprises: a source of fluid under pressure; fluid pressure energized clutch actuating means mounted on the clutch; a fluid pressure line leading from the source of fluid under pressure to the clutch actuating means; a normally closed fluid pressure valve interposed on the fluid pressure line intermediate the source of fluid under pressure and the clutch actuating means; valve actuating means mounted on the valve; and means mounted on the vehicle for automatically energizing the valve actuating means when the vehicle is tilted laterally or inertia force is applied laterally to the vehicle so as to open the valve and pass fluid under pressure from the source to the clutch actuating means to disengage the clutch.

4. A transit mixer weight distribution relief device as defined in claim 3, wherein the means mounted on the vehicle for automatically energizing the valve actuating means comprises a pivotally mounted pendulum.

5. A vehicular weight distribution relief device which comprises: a wheeled vehicle body; a wheeled trailing vehicle mounted on the vehicle body; a source of fluid under pressure; fluid pressure means connected to said source of fluid under pressure, said fluid pressure means being mounted on the vehicle body and on the trailing vehicle, and disposed so as to apply fluid pressure from said vehicle body downwardly and rearwardly to said trailing vehicle and distribute weight from the vehicle body to the trailing vehicle; a normally open pressure relief valve disposed intermediate the source of fluid under pressure and said fluid pressure means; and means for automatically operating the pressure relief valve to relieve pressure to said fluid pressure means when inertia forces are applied laterally to the vehicle body.

6. A vehicular weight distribution relief device as defined in claim 5, wherein the means for automatically operating the pressure relief valve comprises: a source of electric power; a switch mounted on the vehicle body and electrically connected to the electric power source, said switch being normally open and disposed so as to automatically close an electric circuit when inertia forces are applied laterally to the vehicle body; and electric valve actuating means mounted on the pressure relief valve and electrically connected to the switch.

7. A vehicular weight distribution relief device as defined in claim 5, wherein the means for automatically operating the pressure relief valve comprises: a spring-biased valve actuator protruding downwardly from the pressure relief valve; a cam pivotally mounted on the vehicle body, said valve actuator being biased to abut on the camming surface of the cam; a weighted pendulum mounted on and depending from the cam, the valve actuator, the cam, and the pendulum being disposed so that, on the application of inertia forces laterally to the vehicle body, the cam will pivot and the valve actuator, following the camming surface of the cam, will extend to close the fluid pressure line and open the fluid pressure relief valve to relief.

8. A vehicular weight distribution relief device as defined in claim 5, wherein the means for automatically operating the pressure relief valve comprises: a source of fluid under pressure; a fluid pressure energized valve actuator mounted on the pressure relief valve; a fluid pressure line leading from the source of fluid under pressure to the valve actuator; a normally closed fluid pressure valve interposed on the fluid pressure line intermediate the source of fluid under pressure and the valve actuator; valve actuating means mounted on the fluid pressure valve; and means mounted on the vehicle body for automatically energizing the valve actuating means when inertia forces are applied laterally to the vehicle body so as to open the fluid pressure valve and pass fluid under pressure from the source to the pressure relief valve actuator to relieve pressure in the line.

9. A vehiclular weight distribution relief device as defined in claim 8, wherein the means mounted on the vehicle body for automatically energizing the valve actuating means comprises a pivotally mounted pendulum.

10. A transit mixer weight distribution relief device which comprises: an aggregate mixer drum; means for rotatably mounting said drum on a vehicle body frame; power means mounted on the body frame and engageable with the drum for imparting rotational movement to the drum; a clutch interposed between the power means and the drum; a source of electric power; a switch mounted on the body frame and electrically connected to the electric power source, said switch being normally open and disposed so as to close automatically an electric circuit when the body frame is tilted laterally and when inertia forces are applied laterally to the body frame; electric clutch actuating means mounted on the clutch and electrically connected to the switch, said clutch actuating means being disposed so as to disengage the clutch when the switch is closed; a trailing vehicle mounted on the body frame; a source of fluid under pressure; fluid pressure means connected to the source of fluid under pressure, mounted on the body frame and on the trailing vehicle, and disposed so as to apply fluid pressure from the body frame downwardly and rearwardly to the trailing vehicle and distribute weight from the body frame to the trailing vehicle; a normally open pressure relief valve disposed intermediate the source of fluid under pressure and the fluid pressure means; and electric valve actuating means mounted on the pressure relief valve, electrically connected to the switch, and disposed so as to close the line of pressure to the fluid pressure means and open the pressure relief valve to relief when the switch is closed.

11. A transit mixer weight distribution relief device as defined in claim 10, wherein the switch comprises: a box; a pair of tubes having open ends and closed ends, mounted in the box, said tubes being disposed so as to have their closed ends lying in opposite directions; an electrode mounted on the open end of each of said tubes; and a metallic element disposed in each of said tubes at the closed end thereof and movable with each of said tubes so as to make contact with the electrode mounted on said tube when the body frame is tilted or inertia force is applied laterally thereto, the electrical connection between the switch and the clutch actuating means and the valve actuating means being made at the electrodes.

12. A transit mixer weight distribution relief device as defined in claim 10, including an electric signal electrically connected to the switch and disposed so as to be actuated when the switch is closed.

13. A transit mixer weight distribution relief device which comprises: an aggregate mixer drum; means for rotatably mounting said drum on a vehicle body frame; power means mounted on the body frame and engageable with the drum for imparting rotational movement to the drum; a clutch interposed between the power means and the drum; a source of fluid under pressure; fluid pressure energized clutch actuating means mounted on the clutch; a fluid pressure line leading from the source of fluid under pressure to the clutch actuating means; a normally closed fluid pressure valve interposed on the fluid pressure line intermediate the source of fluid under pressure and the clutch actuating means; valve actuating means mounted on the valve; means mounted on the body frame for automatically energizing the valve actuating means when the body frame is tilted laterally or inertia force is applied laterally to the body frame so as to open the valve and pass fluid under pressure to the clutch actuating means to disengage the clutch; a trailing vehicle mounted on the body frame; fluid pressure means connected to the source of fluid under pressure, said fluid pressure means being mounted on the body frame and on the trailing vehicle and disposed so as to apply fluid pressure from the body frame downwardly and rearwardly to the trailing vehicle and distribute weight from the body frame to the trailing vehicle; a normally open pressure relief valve disposed intermediate the source of fluid under pressure and said fluid pressure means; a fluid pressure energized valve actuator mounted on the pressure relief valve; a fluid pressure line leading from the source of fluid under pressure to the valve actuator; a normally closed fluid pressure valve interposed on said fluid pressure line intermediate the source of fluid under pressure and said valve actuator; valve actuating means mounted on said normally closed valve; and a pendulum mounted on the body frame and disposed so as to swing when inertia forces are applied laterally to the body frame and contact said valve actuating means to open said normally closed valve and pass fluid under pressure from the source of fluid under pressure to the valve actuating means on the pressure relief valve so as to close line pressure through the pressure relief valve and open the pressure relief valve to relief.

14. A transit mixer weight distribution relief device as defined in claim 13, including: a fluid pressure energized signal device; and a fluid pressure line interconnecting the signal device and the normally closed valve, the signal device being disposed so as to be energized when said normally closed valve is open.

References Cited by the Examiner

UNITED STATES PATENTS 3,112,100   5/1962   Prichard _____ 259—161

FOREIGN PATENTS 829,292   3/1960   Great Britain.

WALTER A. SCHEEL, *Primary Examiner.*

CHARLES A. WILLMUTH, *Examiner.*